(12) United States Patent
Chang

(10) Patent No.: US 11,807,298 B2
(45) Date of Patent: Nov. 7, 2023

(54) APPARATUS AND METHOD FOR GENERATING WARNING VIBRATION OF STEERING WHEEL

(71) Applicants: Hyundai Motor Company, Seoul (KR); Kia Corporation, Seoul (KR)

(72) Inventor: Kyoung-Jin Chang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/546,481

(22) Filed: Dec. 9, 2021

(65) Prior Publication Data
US 2022/0410972 A1 Dec. 29, 2022

(30) Foreign Application Priority Data
Jun. 25, 2021 (KR) .......... 10-2021-0082954

(51) Int. Cl.
*B62D 15/02* (2006.01)
*B62D 1/06* (2006.01)
*B60Q 9/00* (2006.01)

(52) U.S. Cl.
CPC .......... *B62D 15/029* (2013.01); *B60Q 9/008* (2013.01); *B62D 1/06* (2013.01)

(58) Field of Classification Search
CPC ......... B62D 15/029; B62D 1/06; B60Q 9/008
USPC ...................................................... 340/435
See application file for complete search history.

(56) References Cited

U.S. PATENT DOCUMENTS

| 5,204,815 A * | 4/1993 | Yamamoto ......... B60G 17/0195 280/5.506 |
| 2003/0070863 A1* | 4/2003 | Carlstedt .............. B62D 15/029 180/417 |
| 2007/0085291 A1* | 4/2007 | Lee .......................... F16F 9/145 280/90 |
| 2008/0174415 A1* | 7/2008 | Tanida ................... B62D 1/046 340/438 |
| 2009/0284360 A1* | 11/2009 | Litkouhi .................. B60Q 9/00 340/439 |
| 2010/0164324 A1* | 7/2010 | Kim ..................... H10N 30/802 310/318 |
| 2011/0067941 A1* | 3/2011 | Belzile ................... B62D 61/00 180/252 |
| 2011/0133482 A1* | 6/2011 | Parmar ..................... F03G 3/00 290/1 A |

(Continued)

*Primary Examiner* — Brian A Zimmerman
*Assistant Examiner* — Thang D Tran
(74) *Attorney, Agent, or Firm* — MORGAN, LEWIS & BOCKIUS LLP

(57) ABSTRACT

An apparatus for generating a warning vibration of a steering wheel includes, a reservoir disposed within the steering wheel and filled with a non-conductive fluid, a connection tube connected to the reservoir and configured to form a hydraulic line of the non-conductive fluid, an actuator disposed within the steering wheel, connected to the connection tube, and configured to vibrate according to inflow and outflow of the non-conductive fluid from the connection tube, a positive electrode and a negative electrode disposed on opposite sides of the reservoir, a high voltage power supplier configured to supply a high voltage to be applied to the positive electrode and the negative electrode, and a vibration generation controller configured to selectively apply an output voltage of the high voltage power supplier to the positive electrode and the negative electrode.

18 Claims, 10 Drawing Sheets

(56) References Cited

U.S. PATENT DOCUMENTS

| | | | | |
|---|---|---|---|---|
| 2014/0053371 | A1* | 2/2014 | Feinstein | B25D 17/043 |
| | | | | 16/430 |
| 2014/0054880 | A1* | 2/2014 | Feinstein | B60R 21/203 |
| | | | | 280/731 |
| 2015/0109114 | A1* | 4/2015 | Kariatsumari | B60Q 9/00 |
| | | | | 340/425.5 |
| 2016/0009317 | A1* | 1/2016 | Evreinov | B62D 1/06 |
| | | | | 340/407.1 |
| 2017/0106960 | A1* | 4/2017 | Weber | B63H 20/12 |
| 2017/0291493 | A1* | 10/2017 | Bostick | B60Q 9/00 |
| 2018/0029629 | A1* | 2/2018 | Stebbins | B62D 7/224 |
| 2018/0186208 | A1* | 7/2018 | Coombs | B60G 17/017 |
| 2018/0354551 | A1* | 12/2018 | Blond | B62D 5/30 |
| 2019/0080611 | A1* | 3/2019 | Yamada | G08G 1/166 |
| 2021/0094472 | A1* | 4/2021 | Frazier | B60Q 9/008 |
| 2021/0129864 | A1* | 5/2021 | Wang | H04W 4/40 |
| 2021/0183093 | A1* | 6/2021 | Park | G06T 7/579 |
| 2021/0368770 | A1* | 12/2021 | Bittner | A01C 23/007 |
| 2021/0368772 | A1* | 12/2021 | Stanhope | A01M 7/0042 |
| 2022/0032942 | A1* | 2/2022 | Takei | G06V 20/597 |
| 2022/0207970 | A1* | 6/2022 | Mitsui | G08B 21/06 |

* cited by examiner

Variation of number of times of operations
depending on distance to adjacent vehicle Variation of operation period depending on distance to adjacent vehicle Variation of operation strength depending on
distance to adjacent vehicle

APPARATUS AND METHOD FOR GENERATING WARNING VIBRATION OF STEERING WHEEL

CROSS-REFERENCE TO RELATED APPLICATION

The present application claims priority to Korean Patent Application No. 10-2021-0082954 filed in the Korean Intellectual Property Office on Jun. 25, 2021, the entire contents of which is incorporated herein for all purposes by this reference.

BACKGROUND OF THE INVENTION

Field of the Invention

The present disclosure relates to a vehicle. More particularly, the present invention relates to an apparatus and method for generating warning vibration on a steering wheel of a vehicle.

Description of the Related Art

There may be situations where it is necessary to warn the driver of a dangerous situation while driving a vehicle. A situation that a driver intends to change lanes and a vehicle is approaching in the adjacent lane may be an example. In this case, for example, by generating vibration of a steering wheel gripped by the driver, the driver may be able to recognize a dangerous situation.

In order to generate the vibration of the steering wheel, an electric actuator such as a motor or an electric vibrator is conventionally installed inside the steering wheel.

However, in order to ensure feedback to the driver through the vibration generated by the electric actuator, a fairly large vibration must be generated, and sometimes noise is also induced. On the other hand, mechanical vibrations generated by electric actuators are very rough and sharp, and when transmitted to sensitive areas such as the hands of the human body, may give an unpleasant feeling to the driver.

The information disclosed in this Background of the Invention section is only for enhancement of understanding of the general background of the invention and may not be taken as an acknowledgement or any form of suggestion that this information forms the prior art already known to a person skilled in the art.

SUMMARY OF THE INVENTION

Various aspects of the present invention are directed to providing an apparatus and method for generating a warning vibration of a steering wheel, capable of forming vibrations that a driver may feel more softly and reliably.

An apparatus for generating a warning vibration of a steering wheel according to an embodiment includes, a reservoir disposed within the steering wheel and filled with a non-conductive fluid, a connection tube connected to the reservoir and configured to form a hydraulic line of the non-conductive fluid, an actuator disposed within the steering wheel, connected to the connection tube, and configured to vibrate according to inflow and outflow of the non-conductive fluid from the connection tube, a positive electrode and a negative electrode disposed on opposite sides of the reservoir, a power supplier configured to supply a predetermined voltage to the positive electrode and the negative electrode, and a vibration generation controller configured to selectively apply the predetermined voltage of the power supplier to the positive electrode and the negative electrode.

The positive electrode and the negative electrode may be filled with an electrorheological fluid, respectively.

The positive electrode and the negative electrode may be configured to come close to compress the reservoir when electric power is applied thereto from the voltage power supplier.

The actuator may be disposed in at least one of a left side portion and a right side portion of a steering wheel rim. The connection tube may be disposed along an interior of the steering wheel rim and fluidically connects the reservoir and the actuator.

The actuator may be configured to generate the warning vibration toward an exterior of the steering wheel in a direction perpendicular to a center line of the steering wheel rim.

The reservoir may be disposed within a reservoir frame. The actuator may be disposed within an actuator frame. The reservoir frame may form a closed space except for a passage for connection to the connection tube. The actuator frame may have an open surface facing the exterior of the steering wheel.

The reservoir may be covered with a reservoir film cover having elasticity. The actuator may be covered with an actuator film cover having a predetermined elasticity. The elasticity of the actuator film cover may be formed greater than the elasticity of the reservoir film cover, such that the non-conductive fluid is applied with a pressure in a direction from the actuator to the reservoir.

The vibration generation controller may be configured to, by using the predetermined voltage from the power supplier, apply a unit waveform group of an operation strength to the positive electrode and the negative electrode by an operation period and a number of times of operations.

An apparatus for generating a warning vibration of a steering wheel according to an embodiment may further include a communication interface for communication of external information. The vibration generation controller may be configured to apply a predetermined voltage to the positive electrode and the negative electrode depending on the external information transferred through the communication interface.

At least one of the operation strength, the operation period, and the number of times of operations may be variably set depending on the external information.

The external information may include information on a vehicle distance to an adjacent vehicle running in an adjacent lane. The number of times of operations may be set to be smaller as the vehicle distance to the adjacent vehicle becomes larger. The operation period may be set to be larger as the vehicle distance to the adjacent vehicle becomes larger. The operation strength may be set to be smaller as the vehicle distance to the adjacent vehicle becomes larger.

A method for generating a warning vibration of a steering wheel of a traveling vehicle according to an embodiment includes, determining whether the warning vibration needs to be generated, and generating the warning vibration on the steering wheel by fluidically expanding and relaxing an actuator mounted in the steering wheel, when the warning vibration needs to be generated.

The generating the warning vibration may include compressing and relaxing a reservoir that is mounted in the steering wheel and hydraulically connected to the actuator through a connection tube.

In the generating the warning vibration, the reservoir may be compressed and relaxed by applying a voltage of a preset waveform to a positive electrode and a negative electrode that are disposed on opposite sides of the reservoir and filled with an electrorheological fluid.

In the determining whether the warning vibration needs to be generated, it may be determined that the warning vibration needs to be generated when an intention for a lane change of the traveling vehicle is detected and an adjacent vehicle is traveling in an adjacent lane.

The generating the warning vibration may include, obtaining a vehicle distance to the adjacent vehicle, and generating the warning vibration to be varied depending on the vehicle distance.

The generating the warning vibration to be varied depending on the vehicle distance may include, generating a unit waveform group for generation of the warning vibration, setting a number of times of operations, an operation period, and an operation strength of the warning vibration by the unit waveform group based on the vehicle distance, and generating the warning vibration by the unit waveform group on the steering wheel by the number of times of operations, the operation period, and the operation strength.

The number of times of operations may be set to be smaller as the vehicle distance to the adjacent vehicle becomes larger. The operation period may be set to be larger as the vehicle distance to the adjacent vehicle becomes larger. The operation strength may be set to be smaller as the vehicle distance to the adjacent vehicle becomes larger.

A steering wheel operated for steering of a vehicle, the steering wheel according to an embodiment includes, a steering wheel rim configured to be gripped by a user, a steering wheel boss disposed at a center of the steering wheel rim and connected to the steering wheel rim, a reservoir disposed on at least one of the steering wheel rim and the steering wheel boss and filled with a non-conductive fluid, a connection tube connected to the reservoir and disposed along an interior of the steering wheel rim to form a hydraulic line of the non-conductive fluid, an actuator disposed in at least one of a left side portion and a right side portion of the steering wheel rim, connected to the connection tube, and configured to generate a warning vibration toward an exterior of the steering wheel rim in a direction perpendicular to a center line of the steering wheel rim by vibrating according to inflow and outflow of the non-conductive fluid from the connection tube, and a positive electrode and a negative electrode disposed on opposite sides of the reservoir, filled with an electrorheological fluid respectively, and configured to come close to each other to compress the reservoir when electric power with a predetermined voltage is applied thereto.

The reservoir may be covered with a reservoir film cover having elasticity. The actuator may be covered with an actuator film cover having a predetermined elasticity. The elasticity of the actuator film cover may be formed greater than the elasticity of the reservoir film cover, such that the non-conductive fluid is applied with a pressure in a direction from the actuator to the reservoir.

As described above, according to the embodiment, a warning vibration may be formed such that a driver may feel it more softly and reliably. In addition, the warning vibration may be finely adjusted according to the driving parameters of the vehicle.

Other effects that may be obtained or are predicted by an embodiment will be explicitly or implicitly described in a detailed description of the present disclosure. That is, various effects that are predicted according to an embodiment will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
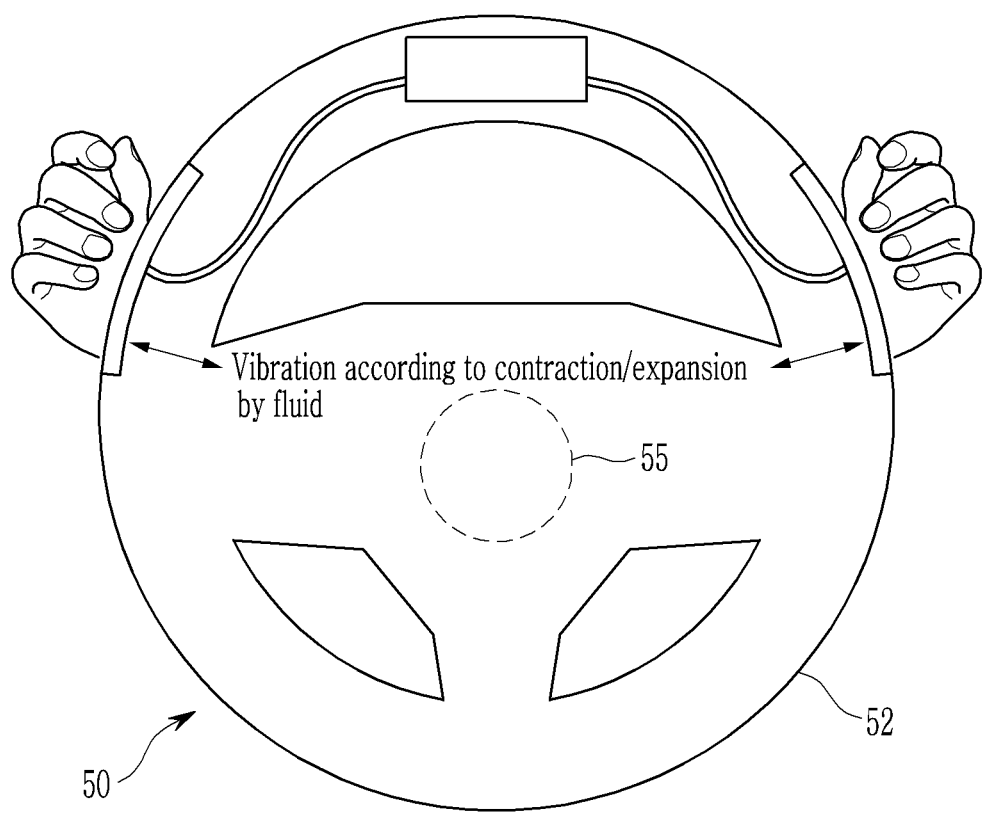
FIG. 1 is a schematic diagram of a steering wheel according to an embodiment.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments disclosed in the present specification will be described in detail with reference to the accompanying drawings. In the present specification, the same or similar components will be denoted by the same or similar reference numerals, and a repeated description thereof will be omitted.

In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

Terms "unit", "part" or "portion", "-er", and "module" for components used in the following description are used only in order to easily describe the specification. Therefore, these terms do not have meanings or roles that distinguish them from each other in and of themselves. In addition, the terms "unit", "part" or "portion", "-er", and "module" in the specification refer to a unit that processes at least one function or operation, which may be implemented by hardware, software, or a combination of hardware and software.

As used herein, the singular forms are intended to include the plural forms as well, unless the context clearly indicates otherwise. As used herein, the term "and/or" includes any one or all combinations of one or more related items.

Hereinafter, an embodiment will be described in detail with reference to the drawings.

FIG. 1 is a schematic diagram of a steering wheel 50 according to an embodiment.

The steering wheel 50 is applied with an apparatus for generating a warning vibration of a steering wheel according to an embodiment, and the configuration of the steering wheel 50 is later described in detail.

As shown in FIG. 1, an apparatus for generating a warning vibration of a steering wheel according to an embodiment is intended to generate a warning vibration on the steering wheel 50, that is, to transfer the warning vibration to the user's hand gripping a steering wheel rim 52 while driving the vehicle. This warning vibration is formed by vibration according to the contraction/relaxation of fluid.

Figure 2:
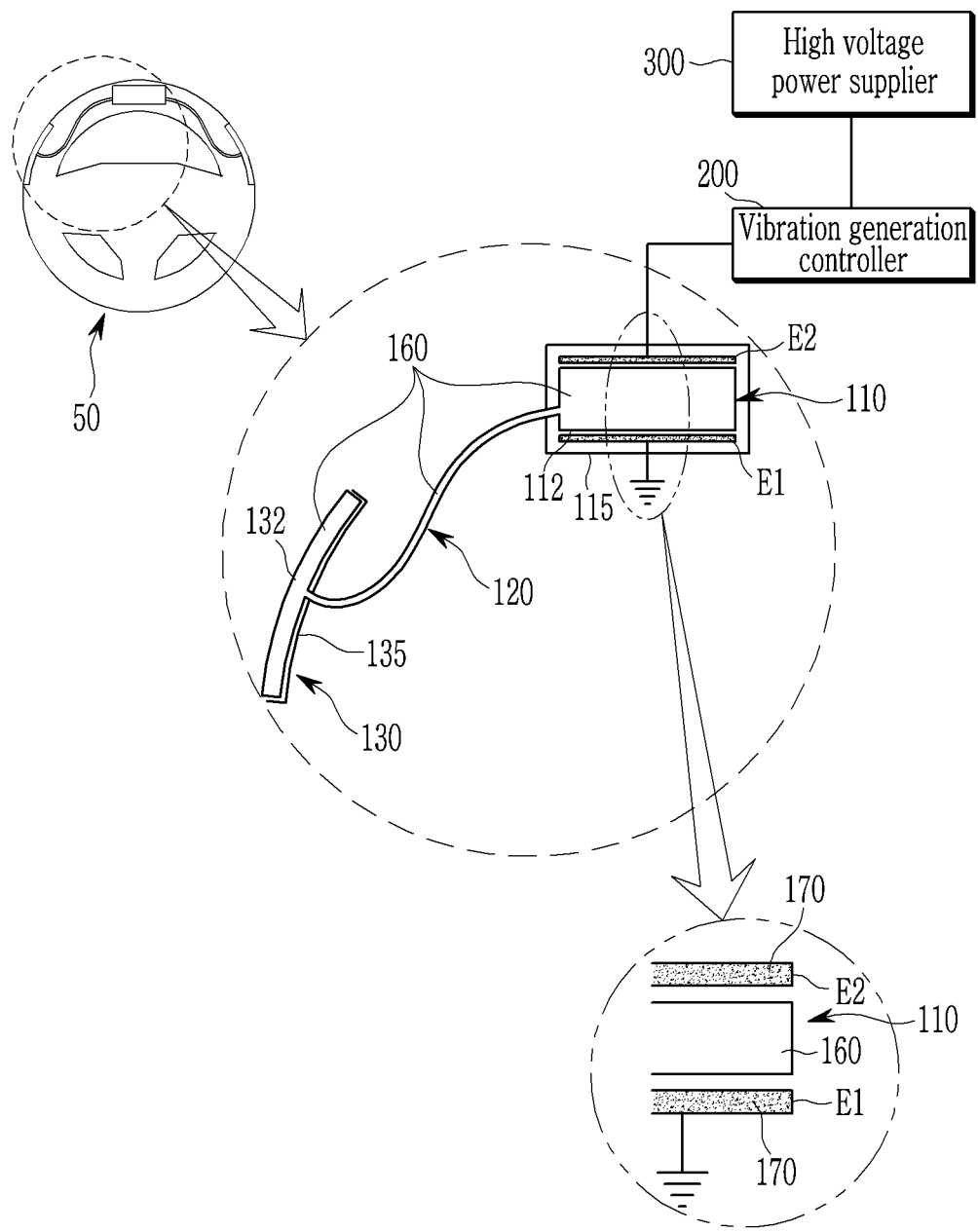
FIG. 2 is a schematic diagram of an apparatus for generating a warning vibration of a steering wheel according to an embodiment.

FIG. 2 is a schematic diagram of an apparatus for generating a warning vibration of a steering wheel according to an embodiment.

As shown in FIG. 2, an apparatus for generating a warning vibration of a steering wheel according to an embodiment includes, a reservoir 110, a connection tube 120, an actuator 130, a positive electrode E2 and a negative electrode E1, a high voltage power supplier 300, and a vibration generation controller 200.

The reservoir 110 is disposed within the steering wheel 50 and filled with a non-conductive fluid 160. The connection tube 120 is connected to the reservoir 110 and forms a hydraulic line of the non-conductive fluid 160. The actuator 130 is disposed within the steering wheel 50, connected to the connection tube 120, and configured to vibrate according to inflow and outflow of the non-conductive fluid 160 from the connection tube 120. The positive electrode E2 and the negative electrode E1 are disposed on opposite sides of the reservoir 110.

The high voltage power supplier 300 is configured to supply a voltage to be applied to the positive electrode E2 and the negative electrode E1. The vibration generation controller 200 is configured to selectively apply an output voltage of the high voltage power supplier 300 to the positive electrode E2 and the negative electrode E1 as a voltage difference of the two electrodes E1 and E2. For example, as shown in FIG. 2, the negative electrode E1 may be grounded and the output voltage of the high voltage power supplier 300 may be applied to the positive electrode E2.

The connection tube 120 is disposed along an interior of the steering wheel rim 52 and connects the reservoir 110 and the actuator 130.

The actuator 130 is disposed in at least one of a left side portion and a right side portion of the steering wheel rim 52. As shown in FIG. 1 and FIG. 2, in the present embodiment, the actuator 130 may be disposed on both the left side portion and the right side portion of the steering wheel rim 52.

The reservoir 110 is disposed within a reservoir frame 115, and the actuator 130 is disposed within an actuator frame 135. The reservoir frame 115 forms a closed space except for a passage for connection to the connection tube 120. The actuator frame 135 has an open surface facing an exterior of the steering wheel 50.

That is, in the present embodiment, when the non-conductive fluid 160 is supplied to the actuator 130, the actuator 130 expands toward the open surface of the actuator frame 132, and a warning vibration may be generated by expansion and relaxation of the actuator 130.

The actuator 130 is configured to generate the warning vibration toward the exterior of the steering wheel 50 in a direction perpendicular to a center line of the steering wheel rim 52.

In more detail, in the present embodiment, the actuator frame 135 is open outward in a radial direction of the steering wheel 50, and accordingly the actuator 130 may generate the warning vibration in the radial direction of the steering wheel 50.

The reservoir 110 is covered with a reservoir film cover 112 having elasticity. The actuator 130 is covered with an actuator film cover 132 having elasticity.

The reservoir film cove 112 and the actuator film cover 132 may be formed by any material that may transfer the non-conductive fluid 160 to the actuator 130 without loss according to the volume change of the reservoir 110, and for example, may be formed by polyamide material.

In the present embodiment, the elasticity (i.e., restoring force) of the actuator film cover 132 is formed greater than the elasticity (i.e., restoring force) of the reservoir film cover 112. Therefore, the non-conductive fluid 160 is applied with a pressure in a direction from the actuator 130 to the reservoir 110.

That is, the reservoir 110 and the actuator 130 interconnected by the connection tube 120 are filled with the non-conductive fluid 160 at a sufficient pressure. Therefore, since the elasticity (i.e., restoring force) of the actuator film cover 132 is formed greater than the elasticity (i.e., restoring force) of the reservoir film cover 112, the actuator film cover 132 may be easily recovered when it has expanded. This feature is helpful in forming the warning vibration as a high frequency waveform in the process of generating the warning vibration through the actuator 130.

The positive electrode E2 and the negative electrode E1 are filled with an electrorheological fluid 170, respectively. Accordingly, the positive electrode E2 and the negative electrode E1 come close to compress the reservoir 110 when electric power is applied thereto from the voltage power supplier.

The electrorheological fluid 170 may be formed as a medium in which conductive polymer particles are dispersed in the non-conductive fluid.

A stable fluid having low viscosity and not conducting electricity may be used as the non-conductive fluid, and for example, silicone oil or mineral oil may be used as the non-conductive fluid.

The conductive polymer particle is a polymer particle having electrical conductivity, and for example, Polypyrrole (PPy), polyaniline (PAM) may be used as the conductive polymer particle.

The electrorheological fluid 170 is not necessarily limited to being a liquid. For example, the electrorheological fluid 170 may be any type of medium allowing re-arrangement of the contained conductive particles, such as paste, gel, elastomer, etc.

In the electrorheological fluid 170, when an electric field is applied to the medium, the conductive polymer particles align according to the direction of the electric field.

For example, depending on the direction of the electric field, an electrostatic force is generated between the polymer particles and the conductive polymer particles are aligned in a uniform direction.

By this re-arrangement, positive charges align to the positive electrode E2 and negative charges align to the negative electrode E1. By this alignment, the positive electrode E2 has positive polarity and the negative electrode E1 has negative polarity. Therefore, the positive electrode E2 and the negative electrode E1 are applied with an attracting force, and this attraction serves to contract the fluid between both electrodes E1 and E2.

The high voltage supplied by the high voltage power supplier 300 may be, for example, thousands of bolts, but the present embodiment is not limited to a specific voltage. The high voltage may be higher than that required for forming sufficient polarity on the positive electrode E2 and the negative electrode E1 to form an attractive force to compress the reservoir 110, according to the teachings of the present embodiment. It will be understood that the specific voltage value may be easily set by a person of an ordinary skill in the art by considering the detailed hardware setting.

In the above description, the non-conductive fluid used as a medium for the electrorheological fluid 170 and the non-conductive fluid 160 that hydraulically connect the reservoir 110 and the actuator 130 are not necessarily the same. For example, silicone oil may be used as the non-conductive fluid used as the medium for the electrorheological fluid 170, and mineral oil may be used as the non-conductive fluid 160 to fluidically connect the reservoir 110 and the actuator 130, or vice versa. However, in the following description, for clarity of explanation, these two non-conductive fluids are simply referred to as the non-conductive fluid.

Figure 3:
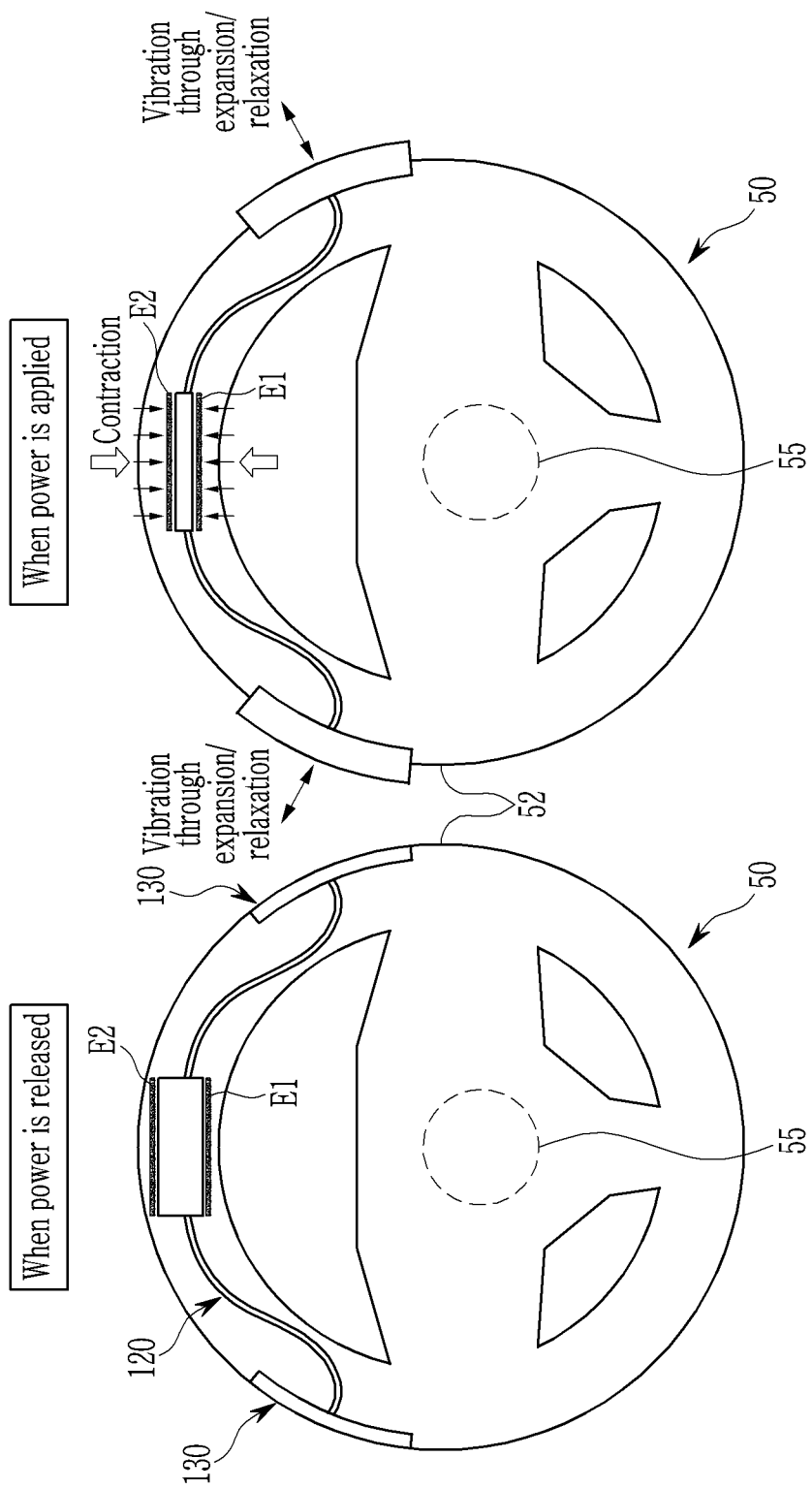
FIG. 3 is a drawing for explaining a mechanism for generating a warning vibration in an apparatus for generating a warning vibration of a steering wheel according to an embodiment.

FIG. 3 is a drawing for explaining a mechanism for generating a warning vibration in an apparatus for generating a warning vibration of a steering wheel according to an embodiment.

In an apparatus for generating a warning vibration of a steering wheel according to an embodiment, under normal conditions, the actuator 130 is held below the surface of the steering wheel rim 52.

At this time, when the high voltage is applied to the positive electrode E2 and the negative electrode E1, the positive electrode E2 and the negative electrode E1 are pulled towards each other, thereby contracting the reservoir 110. At this time, due to the contraction of the reservoir 110, the non-conductive fluid 160 partially moves to the actuator 130 through the connection tube 120, and this flow of the non-conductive fluid 160 expands the actuator 130. Thus, the user feels the pressure change through the hand gripping the steering wheel 50.

When the high voltage is released from the positive electrode E2 and the negative electrode E1, the non-conductive fluid 160 partially moves back to the reservoir 110 due to the elasticity (i.e., restoring force) of the actuator film cover 132 surrounding the actuator 130. Accordingly, the surface of the actuator 130 is restored to a position within the surface of the steering wheel rim 52, and the reservoir 110 is also relaxed to its normal state.

Through the contraction and relaxation of the reservoir 110, and the expansion and relaxation of the actuator 130 caused thereby, the actuator 130 generates vibration, and the user may feel this vibration through the hand gripping the steering wheel 50.

In the existing technology using a conventional electromechanical vibrator, vibration is transmitted to the entire steering wheel, causing noise, reducing the user's driving concentration, or causing discomfort to the driver with harsh or strong stimulation.

However, in the present embodiment, since the fluid is used, the cause of noise is eliminated, and the vibration may be locally generated in the part where the driver mainly grips, so the driving concentration is not deteriorated. In addition, since vibration may be formed such that it is softly but clearly transferred to the user's hand, it is possible to increase the safety of the user and improve the marketability of the vehicle.

Hereinafter, a control configuration of an apparatus for generating a warning vibration of a steering wheel according to an embodiment is described in detail with reference to the drawing.

Figure 4:
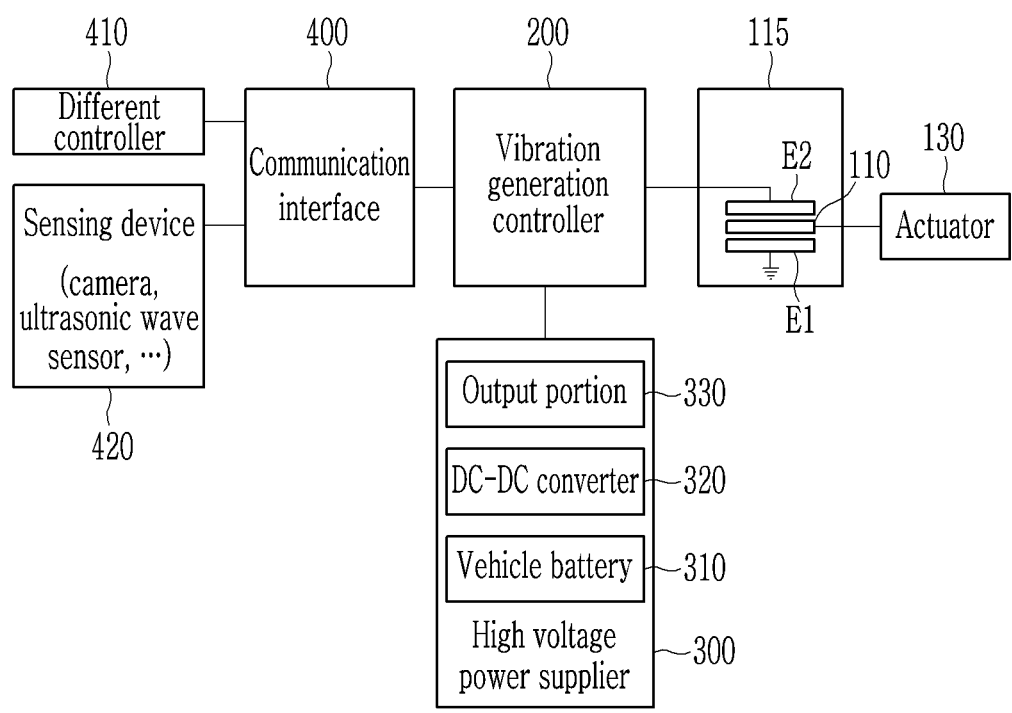
FIG. 4 is a schematic block diagram of a control configuration of an apparatus for generating a warning vibration of a steering wheel according to an embodiment.

FIG. 4 is a schematic block diagram of a control configuration of an apparatus for generating a warning vibration of a steering wheel according to an embodiment.

In the aspect of controlling, an apparatus for generating a warning vibration of a steering wheel according to an embodiment includes, as described above, the high voltage power supplier 300 and the vibration generation controller 200. In addition, an apparatus for generating a warning vibration of a steering wheel according to an embodiment may further include a communication interface 400 for communication of external information. It will be understood that the high voltage power supplier 300, the vibration generation controller 200, and the communication interface 400 may be disposed at any positions of the vehicle as long as they are electrically connected.

The high voltage power supplier 300 may include, specifically, a vehicle battery 310 as a power source, and a DC-DC converter 320 that boosts the voltage of the vehicle battery 310 to the high voltage, and an output portion (e.g., terminals) 330 that outputs the boosted voltage from DC-DC converter 320.

The vehicle battery 310 may be a 12V or 24V battery provided in the vehicle, and for another example, in the case of an electric vehicle or a hybrid vehicle, may be a battery for supplying power to a drive motor. The DC-DC converter 320 uses the power source of the vehicle battery 310 to form the target high voltage.

As stated above, an apparatus for generating a warning vibration of a steering wheel according to an embodiment further includes, the communication interface 400 for communication of the external information.

Figure 6:
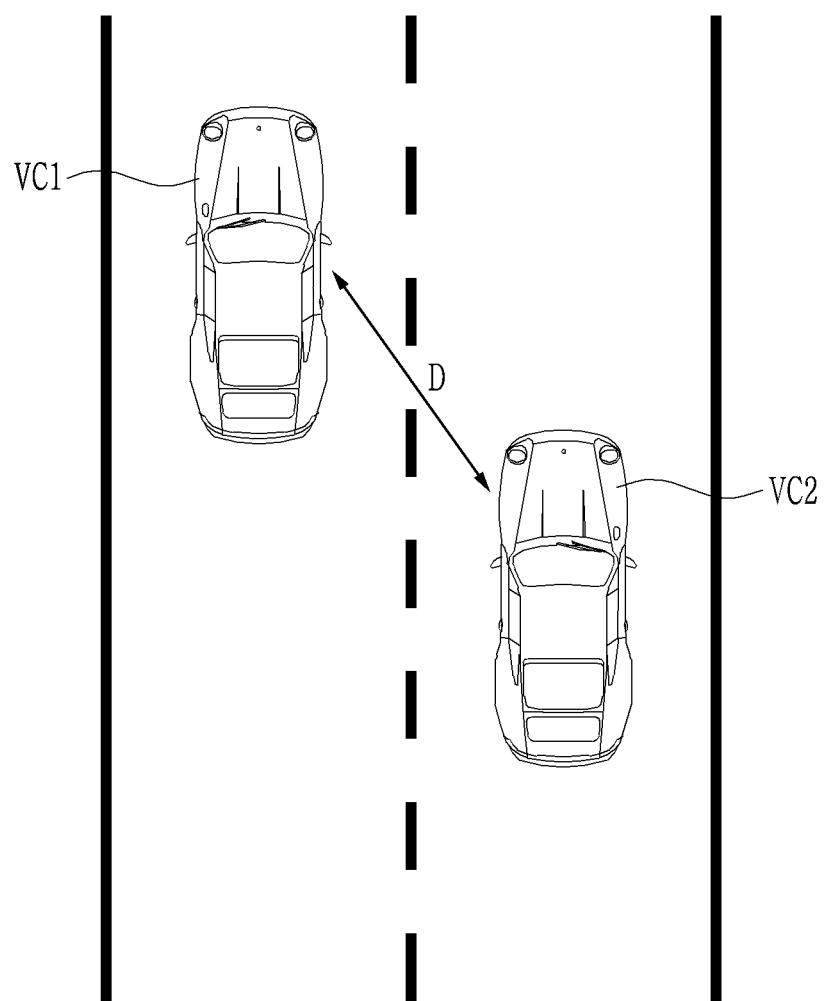
FIG. 6 is a diagram illustrating a case in which an adjacent vehicle exists in an adjacent lane in the rear of a traveling vehicle.

For example, the external information may include an existence of an adjacent vehicle VC2 running in an adjacent lane, and a vehicle distance D to the adjacent vehicle VC2 (refer to FIG. 6). That is, the communication interface 400 may communicate with a sensing device 420 (e.g., a camera, an infrared sensor, an ultrasonic wave sensor, etc.) installed in the vehicle to obtain the external information, and may transfer the obtained external information to the vibration generation controller 200.

For another example, the communication interface 400 may be a communication interface for communicating with different controller 410 in the vehicle. In this case, the different controller 410 may send a vibration generation request signal to the vibration generation controller 200 through the communication interface 400, to request an apparatus for generating a warning vibration of a steering wheel according to an embodiment to generate the warning vibration. In this case, the vibration generation request signal may include, for example, the existence of the adjacent vehicle VC2 running in the adjacent lane, and the vehicle distance D to the adjacent vehicle VC2

When the warning vibration needs to be generated, the vibration generation controller 200 generates the warning vibration by selectively applying the output voltage of the high voltage power supplier 300 to the positive electrode E2 and the negative electrode E1.

At this time, the vibration generation controller 200 is configured to apply the voltage to the positive electrode E2 and the negative electrode E1 depending on the external information transferred through the communication interface 400. That is, the voltage applied to the positive electrode E2 and the negative electrode E1 may be variably set depending on the external information.

Hereinafter, the embodiment of the specific properties of the vibration generated by the vibration generation controller 200 will be described with reference to FIG. 5.

Figure 5:
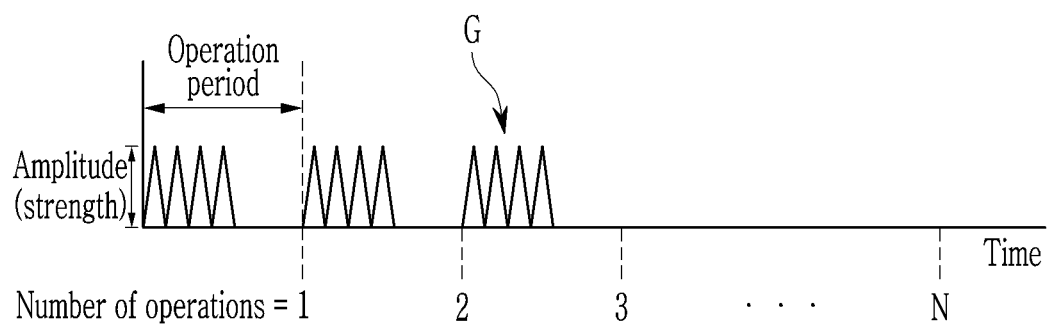
FIG. 5 is a diagram illustrating an exemplary pattern of vibrations generated by an apparatus for generating a warning vibration of a steering wheel according to an embodiment.

FIG. 5 is a diagram illustrating an exemplary pattern of vibrations generated by an apparatus for generating the warning vibration of a steering wheel according to an embodiment.

For example, referring to FIG. 5, by using a voltage from the high voltage power supplier 300, the vibration generation controller 200 may apply a unit waveform group G of an operation strength to the positive electrode E2 and the negative electrode E1 by an operation period and a number of times of operations N.

Here, the unit waveform group G refers to at least one unit waveform. Each unit waveform may be selected from arbitrary waveforms that may form a vibration, such as a square wave, a sinusoidal wave, a triangular wave, a sawtooth wave, etc.

Although FIG. 5 illustrates that each unit waveform is a triangular wave, it will be understood that the present disclosure is not limited thereto. In addition, although FIG. 5 illustrates that four unit waveforms form one unit waveform group G, it may be understood that the present disclosure is not limited to the number of unit waveforms that form the unit waveform group G. That is, it may be understood that each unit waveform group G may include only one unit waveform.

The operation strength means the strength of the waveform (i.e., amplitude of vibration).

The operation period refers to a period from generation of vibration by one or more unit waveforms to generation of the next one or more unit waveforms after passing through a preset rest period. Here, it may be understood that the rest period is mentioned to describe the operating cycle, and does not necessarily have a value greater than 0. that is, the rest period may have a value of 0, and at this time, the unit waveform group G may be repeated without a rest period.

The number of times of operations N means the number of generations of the vibration group (i.e., unit waveform group) generated in the operation period, and FIG. 5 illustrates that N times of vibration groups are generated.

At least one of the operation strength, the operation period, and the number of times of operations may be variably set depending on the external information. For example, these may be variably set depending on the vehicle distance to the adjacent vehicle running in the adjacent lane.

FIG. 6 is a diagram illustrating a case in which the adjacent vehicle VC2 exists in the adjacent lane in the rear of a traveling vehicle VC1.

Figure 7A:
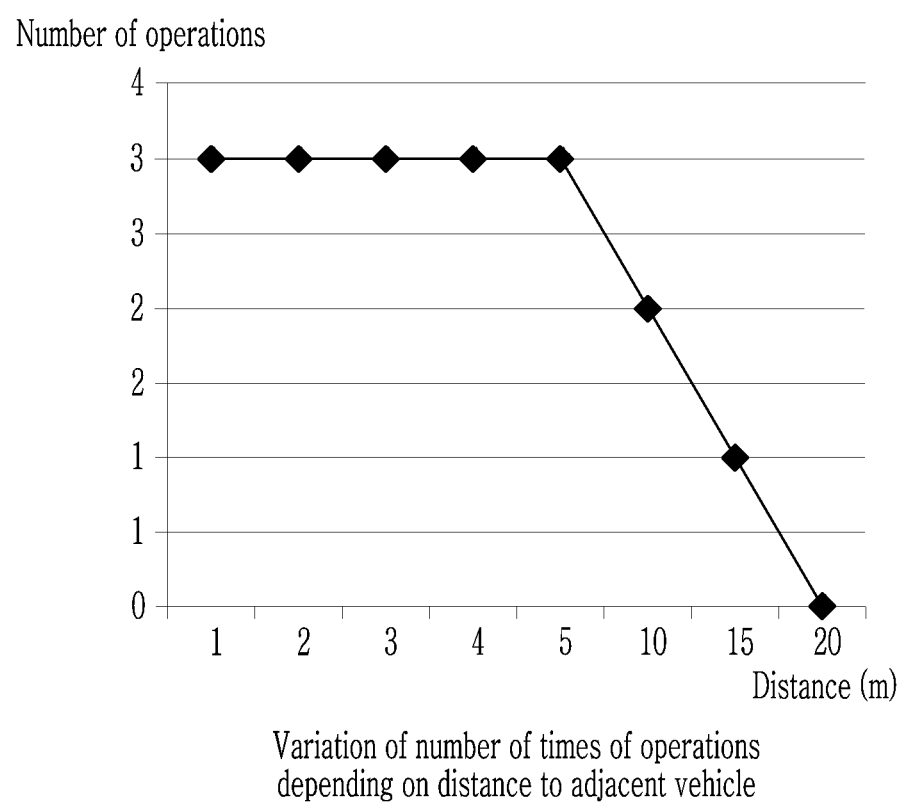
FIG. 7A, FIG. 7B, and FIG. 7C are diagrams illustrating examples in which a vibration pattern generated by an apparatus for generating a warning vibration of a steering wheel according to an embodiment is changed according to external information.
Figure 7B:
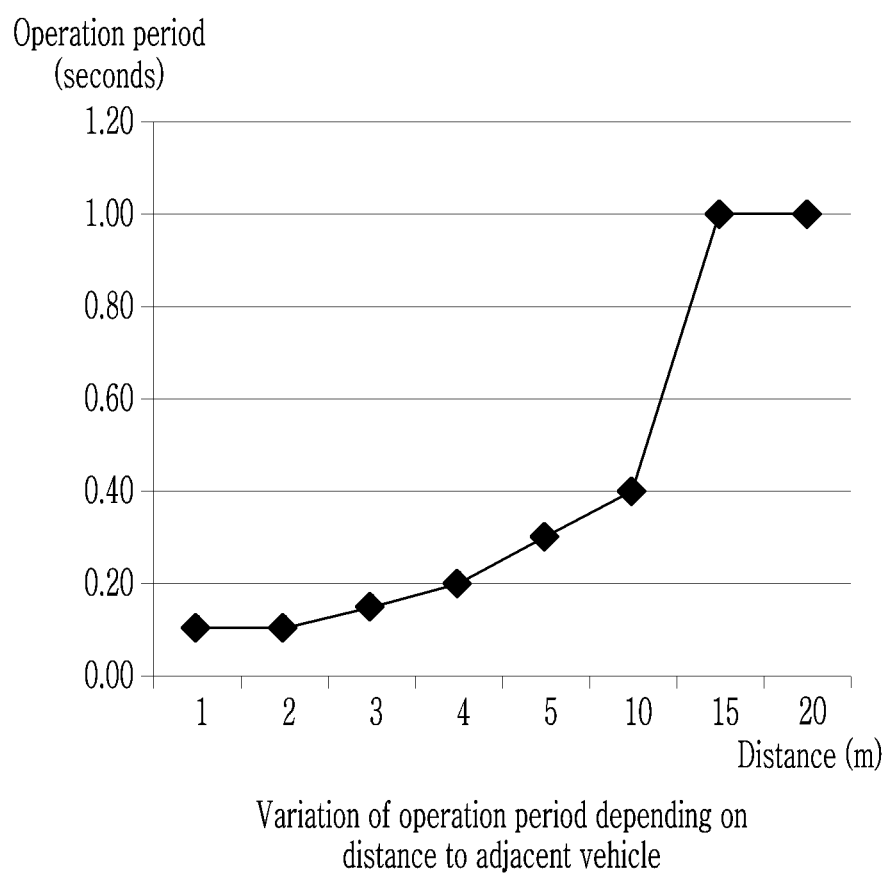
Figure 7C:
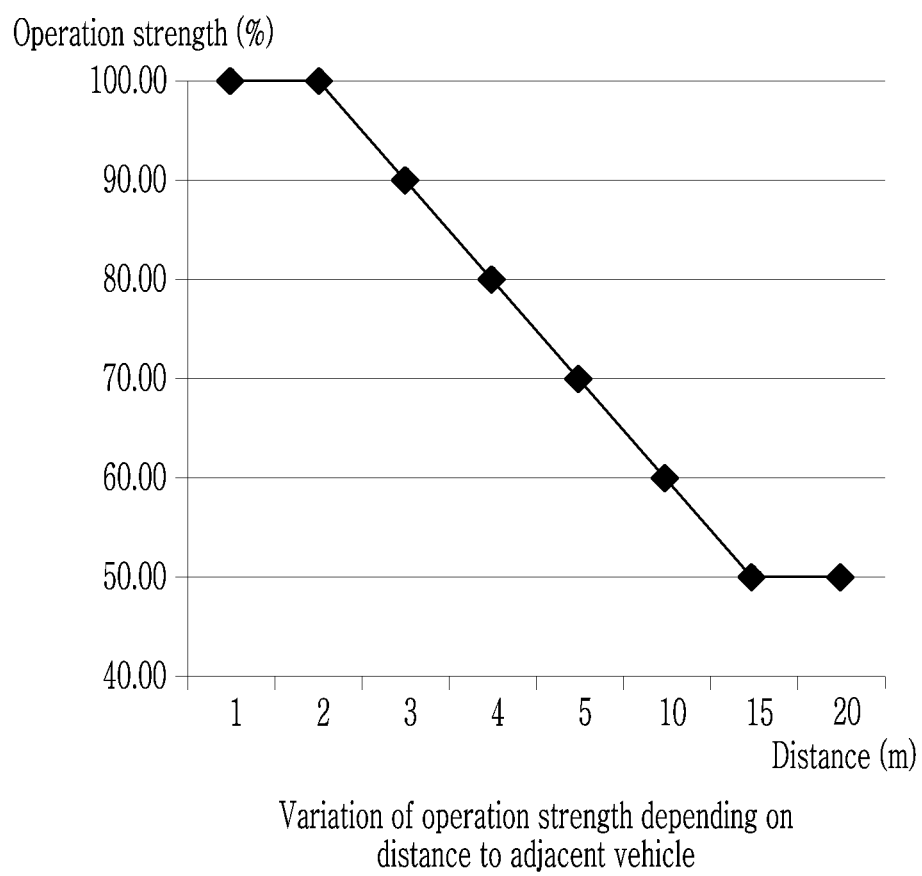

FIG. 7A, FIG. 7B, and FIG. 7C are diagrams illustrating examples in which a vibration pattern generated by an apparatus for generating the warning vibration of a steering wheel according to an embodiment is changed according to the external information.

For example, as shown in FIG. 6, when the adjacent vehicle VC2 is running in the adjacent lane in the rear of the traveling vehicle VC1, the external information may include information on the vehicle distance D to the adjacent vehicle VC2 running in the adjacent lane.

At this time, as shown in FIG. 7A, the number of times of operations is set to be smaller as the vehicle distance D to the adjacent vehicle VC2 becomes larger. As shown in FIG. 7B, the operation period is set to be larger as the vehicle distance D to the adjacent vehicle VC2 becomes larger. As shown in FIG. 7C, the operation strength is set to be smaller as the vehicle distance D to the adjacent vehicle VC2 becomes larger.

Hereinafter, a method for generating the warning vibration of a steering wheel according to an embodiment is described in detail with reference to FIG. 8.

Figure 8:
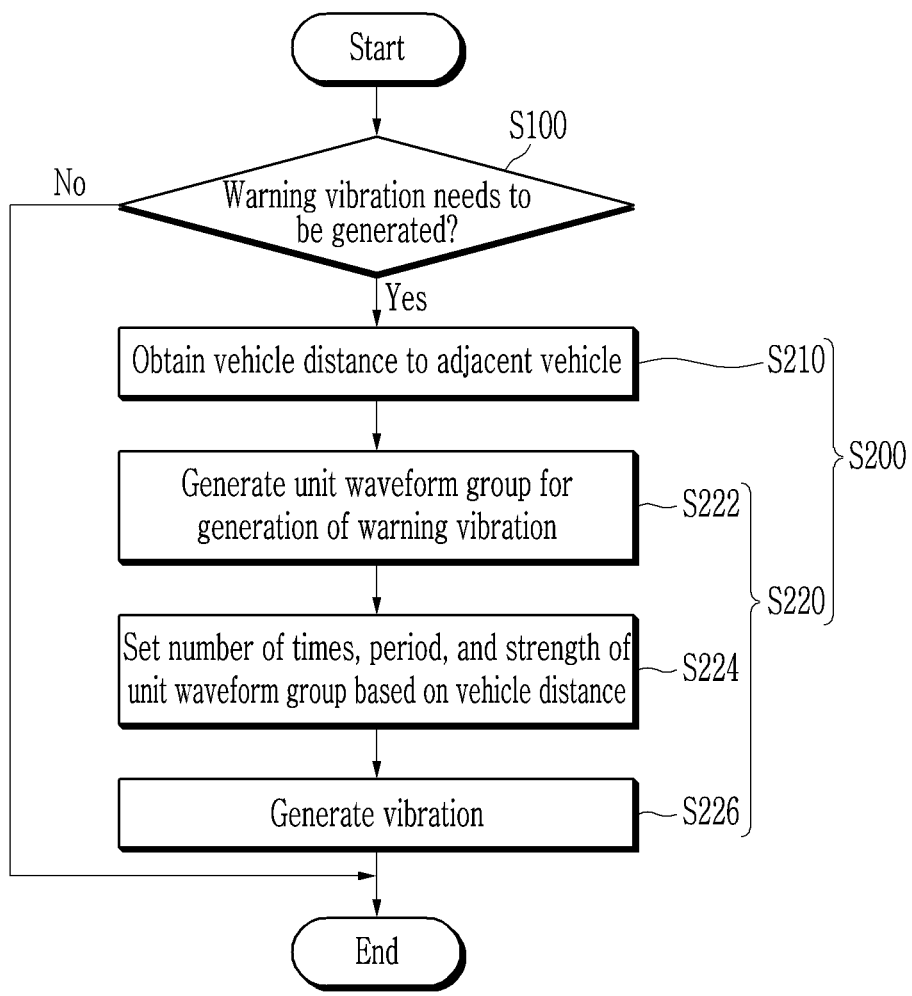
FIG. 8 is a flowchart illustrating a method for generating a warning vibration of a steering wheel according to an embodiment.

FIG. 8 is a flowchart illustrating a method for generating the warning vibration of a steering wheel according to an embodiment.

A method for generating the warning vibration of a steering wheel according to an embodiment may be performed by the vibration generation controller 200. The vibration generation controller 200 may be implemented with at least one microprocessor operated by a preset program. This preset program may include a series of instructions for performing each step included in a method for generating the warning vibration of a steering wheel according to an embodiment, which is described below.

A method for generating the warning vibration of a steering wheel according to an embodiment is a method for generating the warning vibration on the steering wheel 50 of the traveling vehicle VC1.

First, at step S100, the vibration generation controller 200 determines whether the warning vibration needs to be generated on the steering wheel 50.

At the step of S100 of determining whether the warning vibration needs to be generated, the vibration generation controller 200 may determine that the warning vibration needs to be generated, in the case that an intention for a lane change of the traveling vehicle VC1 is detected and the adjacent vehicle VC2 is running in the adjacent lane.

For the intention for the lane change of the traveling vehicle VC1, for example, the vibration generation controller 200 may determine that the intention for the lane change exists in the case that a turn signal lamp of the traveling vehicle VC1 is operated, or the steering wheel 50 is operated over a preset angle or over a preset speed.

Such determination at the step S100 may be performed, for example, by actively detecting, by the vibration generation controller 200, the operation of the turn signal lamp of the traveling vehicle VC1, the existence of the adjacent vehicle VC2 running in the adjacent lane, and the like.

For another example, the different controller 410 (e.g., highway driving assistance (HDA) controller) installed in the traveling vehicle VC1 may detect the operation of the turn signal lamp of the traveling vehicle VC1, the existence of the adjacent vehicle VC2 running in the adjacent lane, and the like, and accordingly, may transmit the vibration generation request signal to the vibration generation controller 200 to request the generation of the warning vibration. In this case, the step S100 corresponds to whether the vibration generation request signal is received from the different controller 410.

When the warning vibration needs to be generated on the steering wheel 50 (S100; Yes), the vibration generation controller 200 generates, at step S200, the warning vibration on the steering wheel 50 by fluidically expanding and relaxing the actuator 130 installed in the steering wheel 50

In more detail, the step S200 of generating the warning vibration may be achieved by compressing and relaxing the reservoir 110 installed in the steering wheel and hydraulically connected to the actuator through the connection tube 120. The reservoir 110 may be compressed and relaxed by applying a voltage of a preset waveform to the positive electrode E2 and the negative electrode E1 disposed on opposite sides of the reservoir 110 and filled with the electrorheological fluid.

During the step S200 of generating the warning vibration S200, the vibration generation controller 200 obtains, at step S210, the vehicle distance D to the adjacent vehicle VC2.

For example, the vehicle distance D to the adjacent vehicle VC2 may be directly obtained by the vibration generation controller 200 through the sensing device 420 installed in the vehicle. For another example, the vehicle distance D may be included in the vibration generation request signal received from the different controller 410, and retrieved therefrom.

Thereafter, at step S220, the vibration generation controller 200 generates the warning vibration to be varied depending on the vehicle distance D.

During the step S220 of generating the warning vibration to be varied depending on the vehicle distance S220, the vibration generation controller 200 generates the unit waveform group for generation of the warning vibration at step S222, and sets the number of times of operations, the operation period, and the operation strength in the warning vibration by the unit waveform group at step S224.

As described in the above embodiment, the number of times of operations may be set to be smaller as the vehicle distance D to the adjacent vehicle VC2 becomes larger, the operation period may be set to be larger as the vehicle distance D to the adjacent vehicle VC2 becomes larger, and the operation strength may be set to be smaller as the vehicle distance D to the adjacent vehicle VC2 becomes larger.

After setting the vibration pattern as such, at step S226, the vibration generation controller 200 generates the warning vibration by the unit waveform group on the steering wheel by the number of times of operations, the operation period, and the operation strength.

In the present disclosure, an embodiment for the steering wheel 50 that generates the warning vibration is further provided. Specific features of the steering wheel 50 have already been described in the above-described embodiment, and may be summarized as follows.

The steering wheel 50 according to an embodiment is the steering wheel 50 operated for steering of the vehicle, and includes the steering wheel rim 52, steering wheel boss 55, the reservoir 110, the connection tube 120, the actuator 130, and the positive electrode E2 and the negative electrode E1.

The steering wheel rim 52 is configured to be gripped by the user. The steering wheel boss 55 is disposed at a center of the steering wheel 50 and connected to the steering wheel rim 52. The reservoir 110 is disposed on at least one of the steering wheel rim 52 and steering wheel boss 55 and filled with the non-conductive fluid. The connection tube 120 is connected to the reservoir 110 and disposed along the interior of the steering wheel rim 52 to form the hydraulic line of the non-conductive fluid 160. The actuator 130 is disposed in at least one of the left side portion and the right side portion of the steering wheel rim 52, connected to the connection tube 120, and configured to generate the warning vibration toward the exterior of the steering wheel rim 52 in a direction perpendicular to a center line of the steering wheel rim 52 by vibrating according to inflow and outflow of the non-conductive fluid 160 from the connection tube 120. The positive electrode E2 and the negative electrode E1 are disposed on opposite sides of the reservoir 110, filled with electrorheological fluids respectively, and configured to come close to each other to compress the reservoir 110 when electric power with a predetermined voltage is applied thereto.

The reservoir 110 is covered with the reservoir film cover 112 having elasticity. The actuator 130 is covered with the actuator film cover 132 having elasticity. The elasticity (i.e., restoring force) of the actuator film cover 132 is formed greater than the elasticity (i.e., restoring force) of the reservoir film cover 112, such that the non-conductive fluid 160 is applied with a pressure in a direction from the actuator 130 to the reservoir 110.

According to an embodiment, a warning vibration may be formed such that a driver may feel it more softly and reliably. In addition, the warning vibration may be finely adjusted according to the driving parameters of the vehicle.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for generating a warning vibration of a steering wheel, the apparatus comprising:
    a reservoir disposed within the steering wheel and filled with a non-conductive fluid;
    a connection tube connected to the reservoir to form a hydraulic line of the non-conductive fluid;
    an actuator disposed within the steering wheel, connected to the connection tube, and configured to vibrate according to inflow of the non-conductive fluid from the connection tube and outflow of the non-conductive fluid into the connection tube;
    a positive electrode and a negative electrode disposed on opposite sides of the reservoir;
    a power supplier configured to supply a predetermined voltage to the positive electrode and the negative electrode; and
    a vibration generation controller configured to selectively apply the predetermined voltage of the power supplier to the positive electrode and the negative electrode.

2. The apparatus of claim 1, wherein the positive electrode and the negative electrode are filled with an electrorheological fluid, respectively.

3. The apparatus of claim 2, wherein the positive electrode and the negative electrode are configured to come close to compress the reservoir when electric power is applied thereto from the voltage power supplier.

4. The apparatus of claim 3,
    wherein the actuator is disposed in at least one of a left side portion and a right side portion of a steering wheel rim in the steering wheel, and
    wherein the connection tube is disposed along an interior of the steering wheel rim and fluidically connects the reservoir and the actuator.

5. The apparatus of claim 4, wherein the actuator is configured to generate the warning vibration toward an exterior of the steering wheel in a direction perpendicular to a center line of the steering wheel rim.

6. The apparatus of claim 5,
    wherein the reservoir is disposed within a reservoir frame,
    wherein the actuator is disposed within an actuator frame,
    wherein the reservoir frame forms a closed space except for a passage for connection to the connection tube, and
    wherein the actuator frame has an open surface facing the exterior of the steering wheel.

7. The apparatus of claim 4,
    wherein the reservoir is covered with a reservoir film cover having a predetermined elasticity,
    wherein the actuator is covered with an actuator film cover having a predetermined elasticity, and
    wherein the predetermined elasticity of the actuator film cover is formed greater than the predetermined elasticity of the reservoir film cover, so that the non-conductive fluid is applied with a pressure in a direction from the actuator to the reservoir.

8. The apparatus of claim 4, wherein the vibration generation controller is configured to, by using the predetermined voltage from the power supplier, apply a unit waveform group of an operation strength to the positive electrode and the negative electrode by an operation period and a number of times of operations.

9. The apparatus of claim 8, further comprising a communication interface for communication of external information,
    wherein the vibration generation controller is configured to determine the predetermined voltage to the positive electrode and the negative electrode depending on the external information transferred through the communication interface.

10. The apparatus of claim 9, wherein at least one of the operation strength, the operation period, and the number of times of operations is variably set depending on the external information.

11. The apparatus of claim 10,
wherein the external information includes information on a vehicle distance to an adjacent vehicle traveling in an adjacent lane,
wherein the number of times of operations is set to be smaller as the vehicle distance to the adjacent vehicle becomes larger,
wherein the operation period is set to be larger as the vehicle distance to the adjacent vehicle becomes larger, and
wherein the operation strength is set to be smaller as the vehicle distance to the adjacent vehicle becomes larger.

12. A method for generating a warning vibration of a steering wheel of a traveling vehicle, the method comprising:
determining, by a controller, whether the warning vibration needs to be generated; and
generating, by the controller, the warning vibration on the steering wheel by fluidically expanding and relaxing an actuator mounted in the steering wheel, when the controller concludes that the warning vibration needs to be generated,
wherein the generating the warning vibration comprises compressing and relaxing a reservoir that is mounted in the steering wheel and hydraulically connected to the actuator through a connection tube, and
wherein, in the generating the warning vibration, the reservoir is compressed and relaxed by applying a voltage of a preset waveform to a positive electrode and a negative electrode that are disposed on opposite sides of the reservoir and filled with an electrorheological fluid.

13. The method of claim 12, wherein, in the determining whether the warning vibration needs to be generated, the controller concludes that the warning vibration needs to be generated when an intention for a lane change of the traveling vehicle is detected and an adjacent vehicle is traveling in an adjacent lane.

14. The method of claim 13, wherein the generating the warning vibration comprises:
obtaining a vehicle distance to the adjacent vehicle; and
generating the warning vibration to be varied depending on the vehicle distance.

15. The method of claim 14, wherein the generating the warning vibration to be varied depending on the vehicle distance comprises:
generating a unit waveform group for generation of the warning vibration;
setting a number of times of operations, an operation period, and an operation strength of the warning vibration by the unit waveform group based on the vehicle distance; and
generating the warning vibration by the unit waveform group on the steering wheel by the number of times of operations, the operation period, and the operation strength.

16. The method of claim 15,
wherein the number of times of operations is set to be smaller as the vehicle distance to the adjacent vehicle becomes larger;
wherein the operation period is set to be larger as the vehicle distance to the adjacent vehicle becomes larger; and
wherein the operation strength is set to be smaller as the vehicle distance to the adjacent vehicle becomes larger.

17. A steering wheel operated for steering of a vehicle, the steering wheel comprising:
a steering wheel rim to be gripped by a user;
a steering wheel boss disposed at a center of the steering wheel rim and connected to the steering wheel rim;
a reservoir disposed on at least one of the steering wheel rim and the steering wheel boss and filled with a non-conductive fluid;
a connection tube connected to the reservoir and disposed along an interior of the steering wheel rim to form a hydraulic line of the non-conductive fluid;
an actuator disposed in at least one of a left side portion and a right side portion of the steering wheel rim, connected to the connection tube, and configured to generate a warning vibration toward an exterior of the steering wheel rim in a direction perpendicular to a center line of the steering wheel rim by vibrating according to inflow of the non-conductive fluid from the connection tube and outflow of the non-conductive fluid into the connection tube; and
a positive electrode and a negative electrode disposed on opposite sides of the reservoir, filled with an electrorheological fluid respectively, and configured to come close to each other to compress the reservoir when electric power with a predetermined voltage is applied thereto.

18. The steering wheel of claim 17,
wherein the reservoir is covered with a reservoir film cover having a predetermined elasticity,
wherein the actuator is covered with an actuator film cover having a predetermined elasticity, and
wherein the predetermined elasticity of the actuator film cover is formed greater than the predetermined elasticity of the reservoir film cover, so that the non-conductive fluid is applied with a pressure in a direction from the actuator to the reservoir.

* * * * *